United States Patent

Valenta et al.

[11] Patent Number: 5,146,093
[45] Date of Patent: * Sep. 8, 1992

[54] LIQUID SCINTILLATION MEASUREMENT SYSTEM WITH ACTIVE GUARD SHIELD

[75] Inventors: Robert J. Valenta, Berkeley, Ill.; John E. Noakes, Athens, Ga.

[73] Assignee: Packard Instrument Company, Inc., Downers Grove, Ill.

[*] Notice: The portion of the term of this patent subsequent to May 23, 2006 has been disclaimed.

[21] Appl. No.: 355,761

[22] Filed: May 22, 1989

Related U.S. Application Data

[63] Continuation-in-part of Ser. No. 167,407, Mar. 14, 1988, Pat. No. 4,833,326, which is a continuation-in-part of Ser. No. 887,067, Jul. 17, 1986, abandoned, which is a continuation-in-part of Ser. No. 721,266, Apr. 8, 1985, Pat. No. 4,651,006.

[51] Int. Cl.$^5$ .............................................. G01T 1/178
[52] U.S. Cl. ...................................... 250/362; 250/364; 250/366; 250/367; 250/369
[58] Field of Search ................. 250/328, 361 R, 361 C, 250/362, 364, 366, 367, 369

[56] References Cited

U.S. PATENT DOCUMENTS

| | | | |
|---|---|---|---|
| 3,842,278 | 10/1974 | Noakes | 250/369 |
| 3,898,463 | 8/1975 | Noakes | 250/367 |
| 3,944,832 | 3/1976 | Kalish | 250/361 |
| 4,049,966 | 9/1977 | Luitwieler | 250/369 |
| 4,251,744 | 2/1981 | Green | 307/362 |
| 4,418,282 | 11/1983 | Horrocks | 250/366 |
| 4,528,450 | 7/1985 | Valenta | 250/369 |
| 4,651,006 | 3/1987 | Valenta | 250/362 |
| 4,833,326 | 5/1989 | Valenta et al. | 250/362 |

FOREIGN PATENT DOCUMENTS

| | | |
|---|---|---|
| 0201445 | 12/1986 | European Pat. Off. . |
| 0253484 | 2/1988 | European Pat. Off. . |
| 2013880 | 8/1979 | United Kingdom . |

OTHER PUBLICATIONS

Noakes & Spaulding, "Pulse Shape Liquid Scintillation Counting for Beta, Gamma or Beta Gamma Counting", pp. 105-117 Liquid Scintillation Counting: Recent Applications and Development, vol. 1, Physical Aspects, published by Academic Press, Inc., 1980.

(List continued on next page.)

Primary Examiner—Constantine Hannaher
Attorney, Agent, or Firm—Arnold, White & Durkee

[57] ABSTRACT

A low-level liquid scintillation measurement system for counting sample optical events resulting from the radioactive decay of a constituent of a sample to be measured while reducing the counting of background optical events which are optical events produced by background radiation and which create electrical pulses other than pulses representing a sample optical event. This system includes a detector located adjacent the sample for detecting optical events and for converting optical events into electrical pulses, a coincidence sensor for receiving the electrical pulses from the detector and producing a trigger pulse when the electrical pulses from the detector coincide with each other, a burst detector for receiving the trigger pulses from the coincidence sensor and the electrical pulses from the detector for determining the number of electrical pulses present in a selected interval following each of the trigger pulses, evaluator connected to the burst detector for determining, in response to the number of pulses detected in the selected interval, the extent to which the optical event represented by the corresponding trigger pulse should be treated as a sample optical event or a background event, and an active guard shield arrangement comprising an auxiliary scintillator optically coupled to the detector. The shield is adapted to be excited by background radiation and to effectively increase the number of electrical pulses present in the selected interval following a trigger pulse generated as a result of the coincident pulses produced due to the background radiation. The auxiliary scintillator is a glass comprising oxides of lithium, magnesium, silicon and cerium.

3 Claims, 3 Drawing Sheets

OTHER PUBLICATIONS

Kalish et al., "An Automatic Computerized Alpha-Beta-Gamma Scintillation Spectrometer", International Conference on Medical & Biological Engineering Jerusalem Aug. 19-24, 1979 (two pages).

"The Alpha-Beta-Gamma Scintillation Spectrometer," an advertising brochure (7 pages) published by Beta Engineering & Development, Ltd. of Beer-Sheva, Israel (Data Unknown).

"Model BSR-103A", and advertising letter (7 pages) dated Feb. 25, 1980 by Beta Engineering & Development, Ltd.

Walraven et al., "Spurious Pulse Rejection In A Photon Correlation Experiment", Review of Scientific Instruments, vol. 50, No. 6 (Jun. 1979) pp. 780-786.

"A Multi-Parameter Low Level LSC System from LKB. Wallac", an advertisement (4 pages) of Wallac.

Disclosure Document No. 173,603, filed Jul. 13, 1987, Noakes, A Low Level Liquid Scintillation Counter Employing a Slow Rise Time Plastic Vial Holder and Pulse Shape Electronics.

"BC-444 Long Timing Constants Plastic Scintillator", Bicron Corporation.

Scintillation Newsletter, Jan. 1987, Bicron Corporation.

"Instruments and Measurements: Chemical Analysis, Electric Quantities, Nucleonics and Process Control", Proceedings of the Fifth International Instruments and Measurements Conference, Sep. 13-16, 1960.

Hurlbut, C. R., "Plastic Scintillators A Survey," American Nuclear Society Winter Meeting, Nov. 1985.

Serendenko, et al. "Scintillation Granules in the Coincidence Method", Instruments and Experimental Techniques, vol. 17, Jan./Feb. 1974, pp. 59-62.

Ruther, et al. "Directional-Correlation Results for 134 BA and 110 Cd Using a Megachannel Gamma-Gamma Coincidence System", Nuclear Instruments and Methods, 173 (1980).

LIQUID SCINTILLATION MEASUREMENT SYSTEM WITH ACTIVE GUARD SHIELD

RELATED CO-PENDING APPLICATIONS

This application is a continuation-in-part of application Ser. No. 07/167,407 filed Mar. 14, 1988, now U.S. Pat. No. 4,833,326 which in turn is a continuation-in-part of application Ser. No. 06/887,067, filed Jul. 17, 1986, now abandoned, which in turn is a continuation-in-part of application Ser. No. 06/721,266, filed Apr. 8, 1985, now U.S. Pat. No. 4,651,006, issued May 17, 1987.

BACKGROUND OF THE INVENTION

This invention generally relates to means for accurately measuring radiation emitted by radionuclides. More specifically, the present invention is directed to an improved liquid scintillation analyzer of the coincident pulse detection type which allows increased accuracy in low level liquid scintillation counting.

Liquid scintillation analyzers have become increasingly common in the accurate measurement of radiation activity in view of their relatively high counting efficiency, even for low energy radioisotopes such as tritium. Although a variety of techniques are used, in its most basic form liquid scintillation analysis involves dissolving or suspending radionuclides in a solvent system capable of absorbing and transmitting energy originating from radioactive decay of a sample without attenuating that energy significantly. The solvent also contains a scintillator material and the combination of the sample, the solvent and the scintillator is commonly called a "scintillator cocktail." When radioactive decay occurs, it is followed by energy transfer from the radionuclide through the solvent system to the scintillator material in such a way that the scintillator material is activated and scintillates, thereby releasing light photons.

Early liquid scintillation analyzers were based on solitary photomultipliers for multiplying light signals resulting from scintillations within the cocktail with the photomultiplier output being amplified and analyzed by a suitable pulse analyzer. Such analyzers were susceptible to a variety of problems arising from inherent system noise as well as interfering radiation from external and internal sources leading to inaccurate measurements. This problem was solved to a certain extent by the advent of coincident pulse detecting liquid scintillation measurement systems which utilize a pair of photomultipliers aligned along a common axis with the radioactive sample being placed in between the two photomultipliers. An electrical pulse arising as a result of the presence of radioactive emission from within the sample is considered to be the result of a legitimate radioactive event only if corresponding pulses from each of the photomultiplier tubes arrive at a coincidence detector within a predefined resolving time interval. By requiring the coincidental registration of radioactive events such liquid scintillation analyzers provide reasonable accuracy of measurement by minimizing the degrading effects arising due to the internal noise generated from within the system.

Such conventional measurement systems provide a certain degree of discrimination against some background events, particularly those due to internal system noise. However, they are critically affected by the existence of background radiation activity which may be generated by a variety of factors including Cerenkov radiation, environmental radiation, cosmic rays, static electricity, chemiluminescence, residual radioactivity of the vial or container for the scintillation cocktail and the glass used in the photomultiplier tubes and other proximate components. Radiation from these sources produces scintillations within the scintillation cocktail sample vial or photomultiplier tube glass which become confused with, and are recorded as, valid cocktail scintillations resulting from actual radioactive decay of the sample. Protection against the effects of external radiation on such measurement systems is accomplished by the provision of a large mass of shielding material, usually lead, to form a radiation guard surrounding the liquid sample. This passive shielding, however, is not totally perfect in preventing external radiation from penetrating the system and may contain its own interfering radiation in the form of contaminants. Additionally, lead shielding is ineffective against contaminating radiation in components that are contained within the shield, such as the sample vial and the photomultiplier tubes.

Additional reduction of the effects of background radiation in liquid scintillation measurements has been accomplished by the use of guard systems employing scintillation materials, additional photodetectors sensing scintillations within the guard scintillator and a set of electronic circuits operating in anti-coincidence with the sample measurement circuitry.

Such systems, although very good at sensing and eliminating erroneous background radiation, are extremely expensive, bulky and inconvenient. As with lead shielding, they are only partially effective in eliminating the effects of background radiation from contaminants within the shielded area.

Subsequent improvements in liquid scintillation measurements have involved the use of a solid scintillation material as a guard and anti-coincidence arrangements with the coincident pulse detectors that are used by the system to detect sample scintillations also being used to detect scintillations in the guard scintillator. These include timing discrimination means capable of distinguishing between the fast decay times of scintillations from the liquid scintillator caused by radioactive events from within the test samples and those scintillations which are induced in the guard scintillator as a result of background radioactivity and have slower decay times. Although the accuracy of measurement is improved, such measuring systems are still susceptible to the effects of background radioactivity, particularly in the measurement of radioactivity levels of materials, such as tritium, which have relatively low energy emission levels, making them less easily distinguishable from the various background radiation sources The parent application Ser. No. 06/721,266, now U.S. Pat. No. 4,651,066, discloses a system which provides improved discrimination between background pulses and those pulses generated by true radioactive events in the sample, thereby improving the efficiency and accuracy of measurement by the use of liquid scintillation analyzers. The system utilizes certain of the inherent characteristics of the pulses being detected in order to ascertain whether they are valid sample pulses generated by sample optical events which are pulse-producing events resulting from the radioactive decay of the sample to be measured or invalid background pulses which are pulses generated by anything other than a sample optical event. This includes background optical events and electrical noise. The main sources of background optical events are scintillations of the sample vial or a photomultiplier tube glass caused by internal contaminating radiation contained within the detection system and its associated shield materials, as well as external radiation that has penetrated the system shield. The background discrimination technique is based on the premise that most background pulses triggering the coincidence detectors of the pulse detection systems have a series of randomly spaced pulses (a characteristic pulse burst) of relatively smaller energy levels and of approximate single photoelectron amplitude immediately following a coincident pulse.

In the system described in the aforementioned parent application, a particular coincident pulse is assumed to have been generated as a result of background scintillation and is disregarded in the determination of the overall energy spectrum of the radioactive sample being tested, if tracking of the output of the photomultiplier tubes for a predetermined period of time after the detection of the coincident pulse reveals that the characteristic burst of low energy pulses has occurred. The number of pulses detected in the pulse burst (the burst count) following a coincident pulse within a predetermined time period (approximately 5 microseconds) is utilized directly to determine whether or not the coincidence pulse is to be counted. Alternatively, the burst count is used in conjunction with the energy level of the coincident pulse to calculate the probability that the detected coincident pulse is the result of a valid sample scintillation.

The above type of burst detection technique provides more accurate measurements as compared to conventional liquid scintillation systems by generally improving discrimination between background and valid sample pulses. However, if the number of pulses existing in a characteristic pulse burst produced by an invalid background event is very small, the threshold number of pulses that must be detected within the predetermined time period following a coincident pulse in order to signify an invalid optical event is correspondingly small. In cases where the threshold number is extremely small, distinguishing between valid and invalid optical events is difficult because of the after-pulsing phenomenon in the photomultiplier tubes, which sometimes produces a small number of pulses following a valid optical event. There is, hence, an increased probability of misclassifying valid and invalid optical events.

This problem is of particular significance when the radionuclide under test has a low level of radioactivity so that the number of radioactive disintegrations and hence the valid count rate resulting from sample radioactivity is low enough to be comparable with the countrate resulting from invalid background events. In such cases, even a few misclassifications can critically affect the sensitivity of measurement by significantly lowering the figure of merit for the measurement system, thereby increasing the probability that a background event will be falsely treated as a valid optical event.

The parent application Ser. No. 07/167,407 now U.S. Pat. No. 4,833,326 discloses a system for solving this problem by adapting the burstdetection technique in a manner that enhances the ability of liquid scintillation analyzers to accurately discriminate between pulses generated due to valid radioactive events and those generated by background radiation activity, especially in the case of extremely low-level radionuclides. That system utilizes an active radioactivity guard shield comprising an auxiliary scintillator located in the space between the two photodetectors for producing optical events in response to background radiation. The active guard shield is designed in such a way that radioactivity from the liquid scintillation sample contained with the auxiliary scintillator of the guard shield is prevented from interacting with the guard shield material. The auxiliary scintillator is easily excited by external, background radiation, and the resulting scintillations are optically coupled into the same photodetectors that are used to monitor the liquid scintillator sample.

The use of the auxiliary scintillator provides a two-way discrimination capability between pulses generated by sampleinitiated optical events and those generated by backgroundinitiated optical events. More specifically, when invalid optical events are produced as a result of background activity, any resulting coincidence pulse is usually followed by the characteristic pulse burst which is detected by the system, whereas valid sample optical events are not followed by such a pulse burst. Desired adjustments are then made in the calculated overall energy spectrum for the monitored sample. The presence of background sources of radiation, such as gamma radiation in the form of cosmic rays, excites the material of the vial which contains the liquid sample and the glass material of the photomultiplier tubes to produce characteristic pulse bursts. The background radiation also invariably excites the auxiliary scintillator material and produces a coincident pulse which is followed by a pulse burst; this burst, however, contains more pulses due to the greater scintillator efficiency and added volume of the auxiliary scintillator material. Because the scintillations from the auxiliary scintillator are detected by the same photomultipliers that detect the other optical events initiated by background radiation, and at the same time, the pulses in the burst from the auxiliary scintillator are superimposed on the pulses from the other sources such as the vial and the glass of the photomultiplier tubes. Thus, the number of pulses in the detected burst is increased significantly by the pressure of the auxiliary scintillator. (The liquid scintillator containing the sample contributes very little to the trailing pulse burst, even though this scintillator too receives the background radiation, because almost all the light emitted by the sample scintillator has a fast decay rate.)

The overall effect of the auxiliary scintillator, therefore, is to enhance or make more noticeable the characteristic pulse bursts generated by background radiation, thereby allowing the pulse bursts to be more accurately and more easily detected by the measurement system. This enhanced pulse burst permits the use of a higher burst count threshold value in order to distinguish easily between valid and invalid optical events, especially when the valid count rate is comparable to the background count rate. It is thus possible to ensure that most background optical events are accurately detected and subsequently discounted or given less weight in the pulse evaluation procedure.

The provision of the auxiliary scintillator material as an active radiation guard shield hence allows increased discrimination between pulses generated as a result of valid scintillations within the sample and those generated by external or internal background radiation activity, thereby providing the "burst-counting" based liquid scintillation measurement system with significantly increased efficiency and accuracy of measurement, especially when used with lowenergy and low-activity radiation samples. The measurement system is simple and convenient to use and does not require additional optical event detection means to realize the improved discrimination capability.

SUMMARY OF THE INVENTION

It is a primary object of the present invention to provide an improved liquid scintillation counter of the type described above with an auxiliary scintillator that improves the system performance for the counting of samples labelled with carbon-14.

Another object of the invention is to provide such an improved liquid scintillation counter in which the auxiliary scintillator is made of glass, which can be efficiently and economically formed into sample vials, e.g., by molding rather than by machining operations which are required for many polymeric scintillators. In this connection, a related object of the invention is to provide an auxiliary scintillator which can be readily formed into vials, vial holders, emvelopes and face plates for photomultiplier tubes, and other desired configurations.

A further object of the invention is to provide such an improved liquid scintillator counter in which the auxiliary scintillator also provides acceptable performance, albeit somewhat inferior to that provided by the use of plastic auxiliary scintillators, for samples labelled with tritium.

Yet another object of this invention is to provide an improved auxiliary scintillator which makes feasible the use of multiple guard shields in a single counting system without increasing the number of parts in the system, by forming conventional parts of the counting system from the auxiliary scintillator material.

A still further object of the invention is to provide an improved auxiliary scintillator which is not vulnerable to attack by solvents in the liquid scintillation cocktails, or by the ozone which can be produced in liquid scintillation counters.

Other objects, characteristics and advantages of the present invention will be apparent from the following detailed description when taken in conjunction with the accompanying drawings.

DESCRIPTION OF THE PREFERRED EMBODIMENTS

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention as defined by the appended claims.

Figure 1:
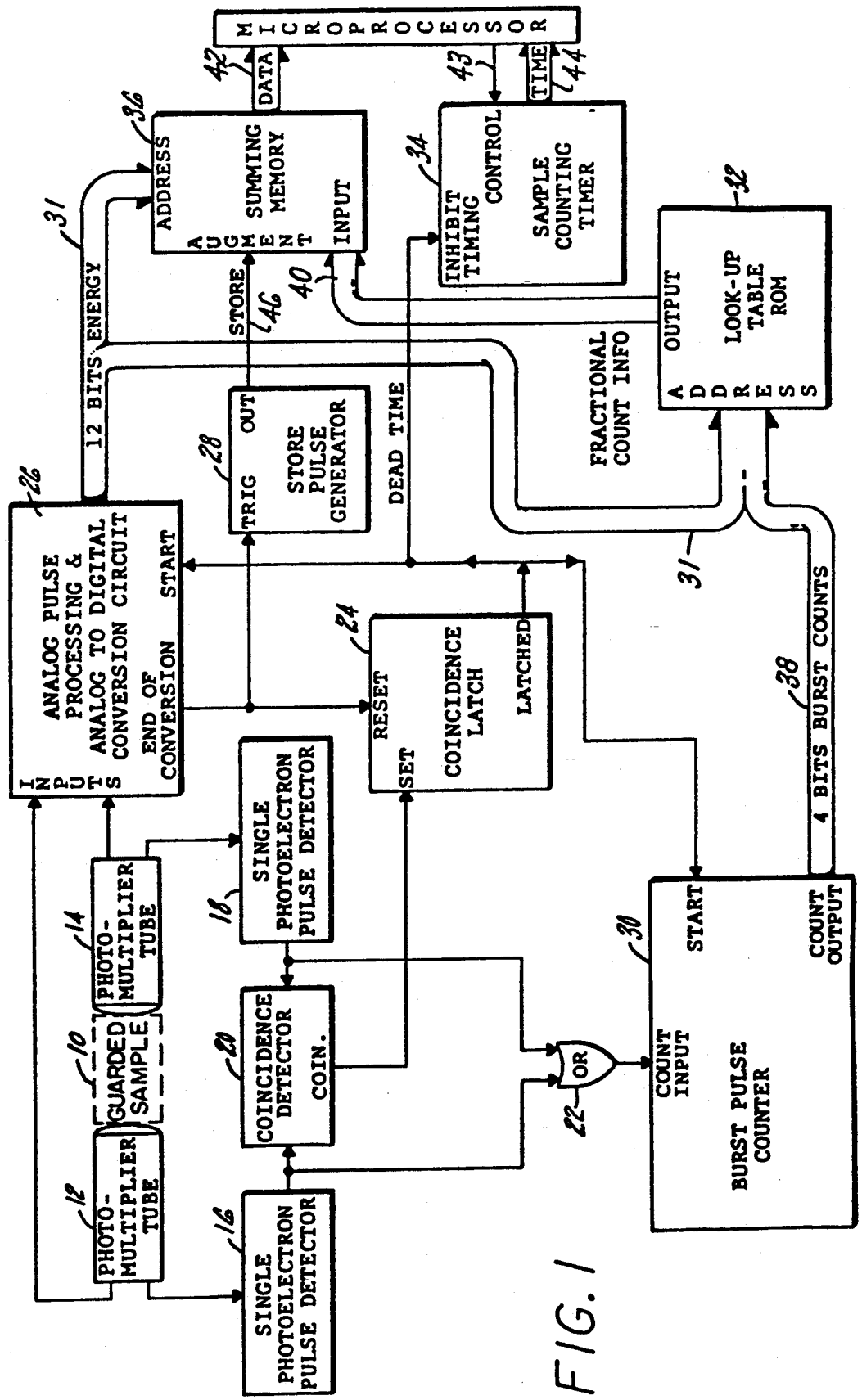
FIG. 1 is a simplified block diagram of a liquid scintillation measurement system of the coincidence detection type including means for detecting the pulse bursts characteristics of background radiation.

Referring now to FIG. 1, there is shown a block diagrammatic view of the "burst-counting" type liquid scintillation measurement system.

In FIG. 1, the guarded light scintillation cocktail unit 10 containing the sample to be tested, is mounted in a shielded area wherein photomultiplier tubes 12 and 14 may be utilized to detect optical events. For purposes of clarity, the measurement system represented in FIG. 1 will be initially described without accounting for the effect of the active guard shield surrounding the sample, and the structural arrangement and function of the guard shield will then be described in detail with reference to FIGS. 2–6. As the radionuclide in the scintillation cocktail decays, beta particles are emitted within the guarded unit 10 and act to energize a scintillating fluor within the cocktail. The fluor converts the energy from the beta particles into light photons which are detected by the photomultiplier tubes 12 and 14. The photomultiplier tubes generate an analog electrical pulse representative of the energy level of the detected event, and their outputs are sensed and transformed to a digital format by a pair of single photoelectron pulse detectors 16 and 18, which are essentially amplituded comparators operating with an appropriate reference voltage.

The digital pulses emitted by the single photoelectron pulse detectors 16 and 18 are called "singles" pulses and are directed to a coincidence detector 20 and to an OR gate 22 and represent the fact that an analog pulse of at least a single photoelectron amplitude has been detected. The coincidence detector 20 indicates when a singles pulse occurs substantially simultaneously at both photomultiplier tubes and in response thereto transmits a coincidence signal to a coincidence latch 24. The coincidence signal acts to trigger the sequence of steps necessary to analyze, convert and store data representing the initiating optical event. The OR gate 22 acts to sum the two singles pulses received from the single photoelectron pulse detectors 16 and 18 and delivers that signal as a count input to a burst pulse counter 30. This signal is called the "summed singles" signal.

Each of the photomultiplier tubes 12 and 14 is also connected to an analog pulse-processing and analog-to-digital conversion circuit 26. This circuit acts to shape the appropriate analog pulses and to provide a digital output signal indicative of the energy level of a particular pulse. This output signal, typically a 12-bit signal, is carried over a bus 31 which extends from the circuit 26 to a look-up-table ROM 32 and a summing memory 36.

The burst pulse counter 30 is likewise connected with a 4-bit data bus 38, to deliver burst counts to the look-up table ROM 32. The ROM 32 contains a table of probabilities based on both the number of burst counts following a coincidence pulse within a predetermined time window, which is supplied over bus 38, and the energy level of the pulse, which is supplied over bus 31. From these two inputs, a probability factor is determined from the ROM 32 and conveyed over a bus 40 to a summing memory 36. The pulse value of 1 is multiplied by the probability that it is a valid sample pulse (as opposed to an invalid background pulse) and is summed in the memory 36. This information is then provided over a data bus 42 to the microprocessor associated with the liquid scintillation counter as is known in the art.

Functions other than probabilities may be used to indicate the validity of the counting process. Moreover, multiple look-up tables could be used depending on the efficiency levels desired and the $E^2/B$ ratios.

The coincidence detector 20 additionally provides a coincidence signal to the coincidence latch 24. This signal acts to set the coincidence latch. Once coincidence is detected, and if the latch is not currently latched indicating a busy condition, a latch signal is generated by the coincidence latch 24. This latch signal is disseminated to the burst pulse counter 30 to effect starting of the time interval after the coincidence pulse during which the burst pulse counter will count pulses. A signal is also delivered to the analog pulse-processing, analog-to-digital conversion circuit 26 to commence operation of that circuit relative to the coincidence pulse, and to a sample-counting timer 34 to indicate to that circuit that the sample counting timing is inhibited. The sample counting timer 34 is started, stopped, and reset by a control signal from the microprocessor through a signal path 43, and the sample counting time is provided to the microprocessor through a bus 44.

The analog pulse-processing, analog-to-digital conversion circuit 26 also provides an indication of the end of the conversion process for a particular pulse through a connection to the coincidence latch 24 in order to effect resetting of the coincidence latch after the pulse has been processed and converted; this signal is connected to a store pulse generator 28 to trigger the store pulse generator to have the summing memory add a particular pulse of fractional count value supplied by the bus 40 to its memory. The output signal 46 of the store pulse generator 28 is connected to the summing memory 36.

When both photomultiplier tubes 12 and 14 generate the appropriate pulses indicating that a sample pulse has been detected and the coincidence detector detects that said pulses have occurred at the same time, then an appropriate signal is supplied to the coincidence latch 24 to provide a latch signal. In the interim all pulses detected by the photomultiplier tubes, both valid sample pulses and scintillations from the guarded sample or the photomultiplier tube glass or electrical noise, are passed on by the photomultiplier tubes to the single photoelectron pulse detectors 16 and 18 and therefrom through the OR gate 22 to the burst pulse counter 30. Once coincidence detector 20 detects coincident pulses, the resulting coincidence signal acts to set the coincidence latch 24 which then starts the time interval for the burst pulse counter 30. It is during this time interval that the number of pulses following the coincidence pulse is detected, and it is this number that is supplied to the look-up table ROM via the data bus 38. The pulse burst counter 30 is designed to have a time interval built therein such that the length of the time window during which pulses are counted is known and is on the order of 1 to 9 microseconds.

The coincidence latch 24, in addition to generating a latch signal, also acts to start the analog pulse-processing and analog-to-digital conversion circuit 26. The circuit 26 acts to generate a 12-bit digital signal indicative of the energy level of the pulse received from the photomultiplier tubes 12 and 14. Once the process of converting the signal to a 12-bit digital signal is completed, and end-of-conversion signal is sent to reset the coincidence latch and to trigger the store-pulse generator 28.

The energy level of the pulse from the analog pulse-processing and analog-to-digital conversion circuit 26 is conveyed over the data bus 31 and the burst count is conveyed over the date bus 38. Both numbers are conveyed to the look-up-table ROM 32 and are utilized to determine the probability that the event indicated by the coincidence detector to be a coincident pulse is an actual sample event to be utilized in determining the spectra of the radioactive decay of the radionuclide within the sample. As the number of burst counts in the time interval following the coincidence pulse increases, the probability that the coincident pulse is a valid sample pulse decreases. Additionally, this probability varies with the overall energy level of the coincident pulse. Hence, the look-up table concerns itself with both the number of burst counts in the time interval and the energy level of the coincident pulse. From these two factors the probability that it is a valid sample pulse is determined. This probability value in theory is assigned a number between zero and 1, and this value is supplied to the summing memory 36.

The end-of-conversion signal from the analog pulse-processing and analog-to-digital conversion circuit 26 is received by the store-pulse generator 28 as a trigger signal. In response to the trigger signal, the output 46 from the store-pulse generator 28 causes the summing memory 36 to add a count at the given energy level to the register summing counts of that level or to add a count or fraction thereof at a specific energy level depending upon the specific pulse. Fractional count information is provided over the bus 40 from the look-up-table ROM 32. Hence, the summing memory multiplies a count value of 1 times the fractional count information, which is the probability that it is a valid sample, and enters that value in its memory. For instance, if the theoretical probability is 0.7 that a pulse is a valid sample pulse, then the summing memory will identify the appropriate energy level and a number of 0.7 will be added to the other numbers at that energy level to indicate the total number of counts for that particular energy level for the sample being monitored.

The burst pulse 30 counter is a combination of a gated counter and a timer. The counter is originally set to zero and the start pulse starts the timer. The timer enables the counting gate and permits summed signals, received from the OR gate 22, to be counted. (Note that the signals involved in generating the coincidence pulses are not counted.) The counting of summed signals (burst counts) continues until the timer times out (approximately 5 microseconds later) and the counting gate is disabled The counted value is then held in the counter and on the bus 38 until the fractional count information on bus 40 is stored in the memory 36.

The single-photoelectron pulse detector is a voltage threshold detector that outputs a digital pulse of fixed width in the area of 30–100 nanoseconds when its analog input amplitude exceeds an amplitude corresponding to a suitable level for detecting a single-photoelectron pulse from the photomultiplier tube. It is able to detect input pulses as short as 2 nanoseconds. This detector has a dead time of about 30–100 nanoseconds each time it receives a pulse from the corresponding photomultiplier tube.

The remainder of the components are basically known components which may be assembled in the manner described and perform the function as designed. The microprocessor is equivalent to the microprocessors incorporated in the current product offering of the liquid scintillation counter manufacturers.

The system described so far is capable of discriminating fairly accurately between coincident pulses generated as a result of actual radioactive emission from the radionuclide with the liquid scintillation sample and those pulses generated due to spurious background events on the basis of the characteristic pulse bursts which follow the spurious events. However, when the pulse burst characteristically produced by invalid background events has a small number of pulses, identifying an invalid background event accurately becomes a problem because of the confusion arising due to the occasional existence of a very small pulse burst following some valid optical events as a result of after-pulsing of the photomultiplier tubes. Discriminating between sample-initiated optical events and background-initiated optical events also becomes more important when the sample has a low level of radioactivity, so that the background radiation becomes a substantial part of the total radiation being detected. In cases like these, the use of an active guard shield, as described below, significantly improves the accuracy of the detection system.

Figure 2:
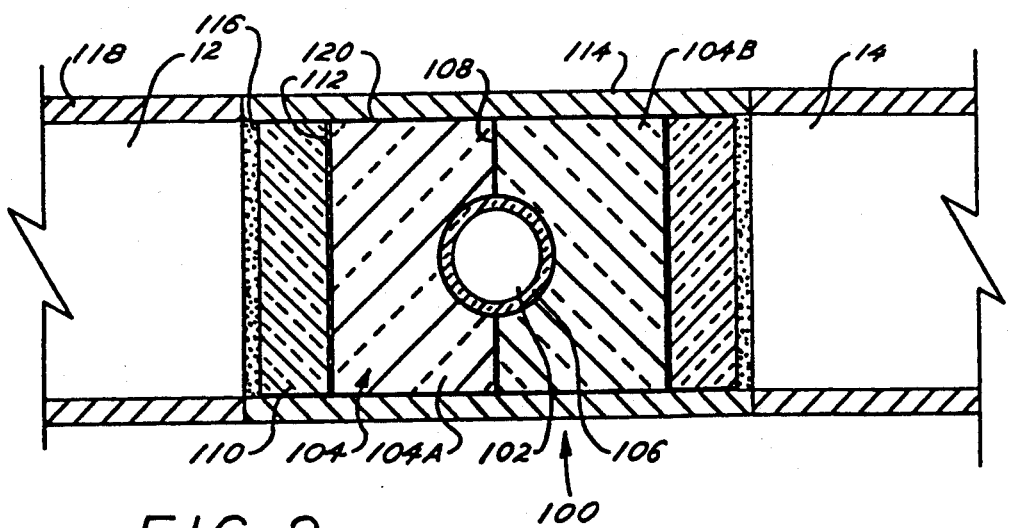
FIG. 2 is an illustration of the structural details involved in encasing the liquid scintillation sample with an active guard shield for use with the measurement system of FIG. 1.

In FIG. 2, the guard shield arrangement includes a counting chamber 100 comprising a vial 102 which is surrounded by a solid auxiliary scintillator 104. The auxiliary scintillator 104 is preferably constructed of two bonded segments, 104A and 104B, of the desired solid scintillation material in a cylindrical configuration which has a central hole formed therein to allow the liquid scintillation vial 102 to be centrally placed within it. The scintillation vial 102 which contains the sample is generally of a transparent material, such as borosilicate glass, commonly used for containing liquid samples. Since the radioactivity of the sample is of the beta type, it is incapable of penetrating the solid material of the glass vial and is prevented from exciting the auxiliary scintillator 104. The auxiliary scintillator 104 can hence be excited only by external background radiation. A quartz sleeve 106 surrounds the scintillation vial 102 and serves as an optical window for allowing photons originating in the liquid sample contained within the scintillation vial 102 to be coupled to the photomultiplier tubes 12 and 14 of FIG. 1. In addition, the sleeve 106 provides protection for the inner surface of the auxiliary scintillator material.

In order to prevent any optical crosstalk between the photomultiplier tubes 12 and 14, a layer of reflective material 108 is provided between the mating surfaces of the bonded scintillator segments 104A and 104B. The reflective material prevents scintillations produced in either one of the bonded segments from exciting a response from the photodetector corresponding to the other of the bonded segments.

Each of the bonded segments 104A and 104B is attached to a quartz window 110 through a layer of light permissible optical epoxy glue 112. The structure formed by the bonded segments and the quartz windows is encased in a metallic housing 114 made of a dense material, such as brass, having low radioactive contaminant levels so that the housing itself does not contribute to background radiation. The solid scintillator material of the counting chamber 100 is optically coupled to the faces of the photomultiplier tubes 12 and 14, via a layer of suitable optical material 116 such as silicone grease placed between the quartz windows 110 and the active surfaces of the photomultiplier tubes 12 and 14. A similar layer (not shown) is used to optically couple the quartz sleeve 106 to the scintillator 104. Each of the photomultiplier tubes is encased in a metallic housing 118 so that coupling of the tubes to the quartz window 110 of the counting chamber 100 results in a light-tight structure.

In order to ensure that a majority of scintillations generated from within the liquid scintillation sample as well as the surrounding solid scintillator reach the respective faces of the two photomultiplier tubes 12 and 14, a coating 120 of reflecting powder, paint or vacuum-deposited aluminum is provided on all outer surfaces of the scintillator 104 except at places where optical transmission is necessary, such as the interfaces with the quartz sleeve 106 and with the faces of the photomultiplier tubes.

The above arrangement allows convenient assembly and disassembly of the counting chamber and the photomultiplier tubes. The provision of the quartz window serves as a permanent means for protecting the auxiliary scintillator and allows the counting chamber to be conveniently decoupled from the photomultiplier tubes (when the tubes have to be replaced or for any other reason) and reassembled without affecting the solid scintillator in any way.

The function of such a detector, which includes the liquid scintillation sample vial surrounded by a solid scintillator in enhancing the operation of the measuring system of FIG. 1 will now be described.

External radiation such as cosmic rays, strikes the glass material of the scintillation vial as well as the glass of the photomultiplier tubes and produces scintillations which constitute invalid optical events. Because the material of the vial and the photomultiplier tube is conventionally chosen to be of low scintillation capacity, characteristic pulse bursts following such invalid events are likely to contain a small number of pulses. This requires a lower burst count discrimination threshold and, as discussed above, increases the probability of erroneous discrimination between valid and invalid optical events which seriously affects the accuracy of measurement in the case of low-level scintillation counting applications.

The provision of the active guard shield enhances the accuracy of the burst counting measurement system in such applications. The auxiliary scintillator material of the guard shield is selected to be easily excited by external radiation and hence produces a burst of photons over a time period that is long in comparison to the length of time over which the scintillation cocktail emits photons. In addition, the auxiliary scintillator is chosen to be a fairly efficient transmitter of light so that most of the light from the scintillation cocktail is coupled directly to the photomultiplier tubes. The auxiliary scintillator also must contain a very low amount of radioactive contaminants so that no significant background radioactivity is generated by the auxiliary scintillator itself.

When cosmic rays strike the auxiliary scintillator 104, it scintillates and produces corresponding electrical signals within the photomultiplier tubes 12 and 14. The subsequent operation of the rest of the measurement system is identical to the description provided in the case of FIG. 1. The significance, however, is that when the auxiliary scintillator 104 is excited by external radiation such as gamma rays, it produces a characteristic pulse burst (following a detected coincident pulse) which includes an increased number of pulses as compared to the characteristic pulse burst normally resulting from the external excitation of the glass material of the scintillation vial and the photomultiplier tubes.

It will be noted that external radiation may produce background scintillations from both the auxiliary scintillator and the sample vial since a background gamma ray may pass through both the vial and the auxiliary scintillator depending upon its direction. These two background scintillation effects are inherently coincidental in nature, and because of mutual optical coupling (FIG. 2), the strong characteristic pulse burst from the solid scintillator is superimposed onto the relatively weaker characteristic pulse burst from the material of the vial and the photomultiplier tubes. The "weak" pulse burst normally resulting from the background radiation excitation is thus augmented by the corresponding "strong" pulse burst resulting from background radiation excitation of the solid scintillator, thereby making the characteristic pulse bursts more noticeable (i.e., increased number of pulses within a selected time interval following a coincident pulse) so that the burst count discrimination threshold can be raised to a higher count. This higher threshold level results in a decreased probability of erroneous discrimination between valid and invalid optical events, resulting in a higher counting efficiency and a reduced background.

Even if the scintillation vial and photomultiplier tube glasses have weak photon emission properties, the presence of the guard shield results in stronger characteristic pulse bursts as a result of background radiation and consequently improved discrimination and accuracy of measurement, especially for cases where count rates for valid and invalid optical events are of the same order of magnitude in the absence of the guard shield. The net result is that even though a valid sample optical event has the possibility of occasionally being followed by burst pulses due to photomultiplier tube after-pulsing, a significantly reduced number of valid optical events are misclassified by the detection system as invalid optical events and vice-versa because of the increased burst count threshold. This directly increases the figure of merit for the measurement system, which is defined as $E^2/B$, where E is the ratio of the number of detected disintegrations to the total number of disintegrations and B is the number of detected background events in the absence of sample radioactivity, since the number of detected valid events is increased (resulting in a higher value for E), while the number of background events (B) is decreased.

It will be understood that the presence of the auxiliary scintillation material aids in the measurement process because the illustrative measurement system is capable of rejecting coincident pulses generated by background radiation on the basis of the burst-counting technique described above with reference to FIG. 1. That is, the combination of the active guard shield with the burst-counting discrimination technique produces a substantial increase in accuracy of liquid scintillation measurement.

The light emission from a "slow" scintillator is generally represented by one or more exponential decays. The faster decays are referred to as the "main components" of the light emission, and are usually characterized by their "decay constants" (the time required for the intensity of the light emission of each individual component to be reduced to 50% of its peak value) expressed in nanoseconds. Some scintillators have a slowly decaying component with a decay constant that is several orders of magnitude slower than the faster components. This slowest decay as referred to as the "afterglow", and is usually characterized by the percentage of the peak light intensity remaining after a prescribed time interval expressed in microseconds or milliseconds.

The decay constant of the main component of the light emission from a liquid scintillator for measuring beta radiation is preferably a small fraction of the dead time of the single-photodetector-pulse detectors 16 and 18. For example, when the dead time of the detectors is 80 nanoseconds, the sample scintillator typically has a maincomponent decay constant of less than 5 nanoseconds. Slower decay components of the liquid-scintillator light emissions which would be confused with the slower emission form the auxiliary scintillator are removed by allowing the presence of a small amount of oxygen in the liquid scintillation cocktail.

The auxiliary scintillator 104 has a main-component decay constant much longer than that of the sample scintillator, and also much longer than the dead time of the single-photoelectron-pulse detectors 16 and 18. In general, the probability that detected coincident pulses originated from a background event increases as the number of pulses in the burst-detection interval increases. Consequently, it is desirable to detect as many as possible of the pulses occurring within this interval, which in turn means it is desirable for the auxiliary scintillator to continue to emit light throughout a substantial portion of the burst-detection interval. For example, when the burst detection interval is 5 microseconds, it is preferred that the auxiliary scintillator have a main-component decay constant of at least 250 nanoseconds. In order to prevent the auxiliary scintillator from interfering with the evaluation of the next coincident-pulse detection, the afterglow of the auxiliary scintillator should be at a statistically insignificant level at the end of the coincident-pulse-evaluation interval.

In accordance with the present invention, the auxiliary scintillator is a glass containing lithium, magnesium, silicon and cerium. The glass preferably comprises oxides of those four elements. Such glasses are commercially available and are described in the literature, such as Anderson et al., "Glass Scintillators for the Detection of Nuclear Radiations," published in the *Proceedings of the Fifth International Instruments and Measurements Conference*, Sep. 13-16, 1960, Vol. 2, Academic Press Publishers, New York and London, 1961.

The glass scintillators used as the active guard shield in this invention can be readily molded to form vials, vial holders or any other desired configuration. For example, the guard shield may be formed as an integral part of the PMT's. This easy formability of the glass scintillators is in contrast to the polymeric scintillators, which must usually be machined to form shapes such as vials, vial holders, PMT face plates and envelopes Thus, the use of the glass scintillators greatly reduces the production time and cost of fabricating the active guard shield used in this invention. With the glass scintillators it also becomes feasible to have multiple guard shields without increasing the number of parts in the liquid scintillation counting system. For example, the sample vial, the vial holder and the envelopes and face plates of both PMT's can be made of glass scintillators so that they serve as the active guard shield in addition to performing their normal functions. With multiple auxiliary scintillators, discrimination between valid and invalid optical events can be enhanced even more.

It has been found that the use of glass scintillators as the active guard shield also produces higher figures of merit than the polymeric scintillators when counting samples labeled with carbon-14. When counting samples labeled with tritium, the figure of merit is lower than that obtained with polymeric scintillators, but still acceptable.

Another advantage of the glass scintillators is that they are not vulnerable to attack by solvents in the liquid scintillation cocktails or by ozone. Polymeric scintillators can be attacked by both solvents and ozone, causing them to deteriorate with time. The glass scintillators can also be readily doped for better detection of specific types of background radiation.

Figure 3:
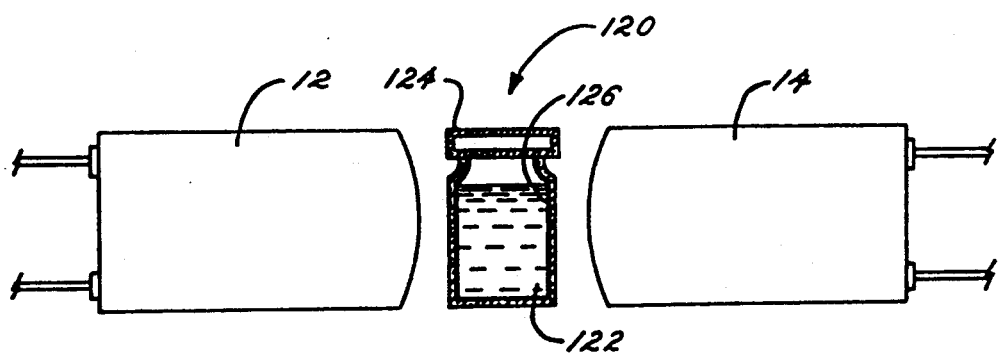
FIG. 3 is a diagrammatic illustration of an alternative arrangement for providing an active guard shield around the liquid sample.

Referring now to FIG. 3, there is shown an alternate and structurally uncomplicated configuration of an active guard shield arrangement that can be used in conjunction with the liquid scintillation measurement system of FIG. 1 and/or the auxiliary scintillator materials described above. This arrangement dispenses with the need for the active guard shield to be constructed with the two photomultiplier tubes as the discretely structured unit shown in FIG. 2. In the embodiment of FIG. 3, the glass liquid scintillation vial 120 itself forms the active guard shield for the liquid scintillation cocktail 122 contained within the vial. More specifically, the vial 120 is composed of the auxiliary scintillator glass, and is positioned within the operating range of the two photomultiplier tubes 12 and 14 which for the optical event detection means in the liquid scintillation measurement system of FIG. 1. The vial 120 can be readily molded from the auxiliary scintillator glass, thereby enabling mass production of the vials at a low cost.

The liquid scintillation vial 120 is provided with an optically transparent electron impermissive coating 126 on its inside surface in order to prevent the radioactivity emitted by the liquid sample from exciting the solid scintillator material of the vial. More specifically, the coating 126 prevents the beta radiation from the liquid sample from striking the glass scintillator material of the vial. However, background radiation, such as cosmic rays which essentially consist of gamma radiation, has substantially greater penetration capability and easily passes through the scintillation vial 120 and the electron impermissive coating 126 to strike the liquid scintillation cocktail 122 contained within the vial 120. Conventional external reflector means (not shown) is preferably provided around the scintillation vial in order to contain and direct scintillations from the vial toward the photomultiplier tubes.

The principle of operation of the guard-shield configuration of FIG. 3 is essentially the same as that described above with respect to FIG. 2. Both valid events due to sample radiation and invalid events due to undesired background external radiation such as cosmic rays produce scintillations in the liquid scintillator 122. In the case of invalid events, a resultant coincident pulse detected by the photomultiplier tubes 12 and 14 is followed by the pulse burst characteristic of background radiation, which the measurement system of FIG. 1 is capable of detecting. The auxiliary scintillator glass of the liquid scintillation vial 120 acts as an active guard shield and is also excited by any external radiation and, at substantially the same time, produces scintillations which result in coincident pulses which are followed by a pulse burst characteristic of the auxiliary scintillator glass. This results in a characteristic pulse burst that is enhanced by virtue of an increased number of pulses, and which may be more easily and accurately used by the measurement system of FIG. 1 to accurately distinguish between valid and invalid optical events.

Figure 4:
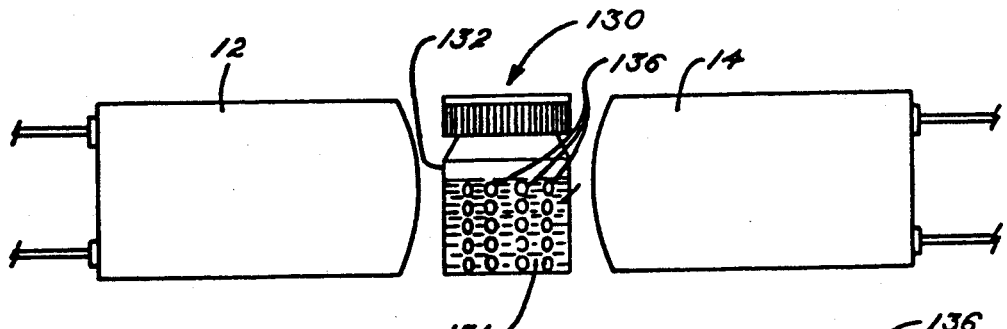
FIG. 4 is an illustration of a third arrangement of the active guard shield for use with the measurement system of FIG. 1.
Figure 4A:
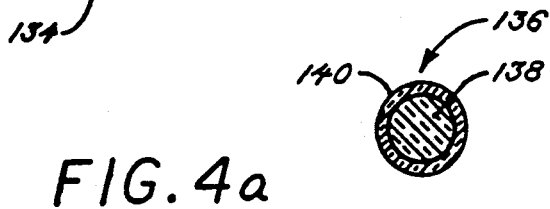
FIG. 4a is an enlarged cross-sectional view of a typical solid scintillator bead for use with the embodiment of FIG. 4.

FIG. 4 shows another configuration of an active guard shield arrangement for use in conjunction with the liquid scintillation measurement system of FIG. 1. In the embodiment of FIG. 4, the liquid scintillation vial 130 is of a standard low scintillation capacity material 132, such as conventionally used in liquid scintillation measurement systems. The active guard shield for the liquid scintillation cocktail 134 in this case is provided within the scintillation cocktail itself in the form of a multiplicity of small beads 136 made of the auxiliary scintillator glass. Each of the beads 136 consists of a central core of the scintillator glass 138 which is provided with an optically transparent outer coating 140 of a suitable electron impermissive material, as shown in the enlarged view of FIG. 4A. The auxiliary scintillator glass of the beads 136 is preferably an efficient transmitter of light, although no light need actually pass through the scintillator beads. The beads 136 are mixed into and held in suspension by the solvent contained in the liquid scintillation cocktail 134. The outer coating 140 of the beads 136 prevents the charged-electron beta radiation from the radioactive sample in the cocktail from penetrating through to strike the auxiliary scintillator glass 138. External gamma radiation, on the other hand, easily penetrates the scintillation vial 132, the scintillation cocktail 134 and the coating 140 of the beads 136 to strike and produce scintillations within the auxiliary scintillator glass of the beads. The embodiment of FIG. 4 is also preferably provided with conventional reflector means (not shown) disposed externally around the scintillation vial to direct light scintillations from the vial to the photomultiplier tubes.

As in the embodiments discussed with reference to FIGS. 2 and 3, the beads of auxiliary scintillator glass act as an active guard shield which is responsive to external radioactivity and effectively produces an enhanced characteristic pulse burst in the presence of external radiation.

Figure 5:
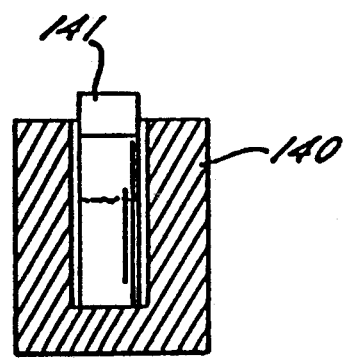
FIG. 5 is a vertical section of a fourth arrangement of the active guard shield for use with the measurement system of FIG. 1.

FIG. 5 illustrates an embodiment in which the auxiliary scintillator takes the form of a glass vial holder 140 for receiving a sample vial 141. This vial holder 140 is similar to the guard shield 104 of FIG. 2, except that the vial holder 140 is removable from the counting chamber. Commercial liquid scintillation spectrometers are conventionally used with two different sizes of vials. Thus, the outside dimensions of the vial holder 140 are preferably the same as the dimensions of the larger of the two conventional vials, while the inside dimensions of the vial holder 140 are slightly larger than those of the smaller conventional vial; these dimensions permit a conventional small vial 141 to be received in the vial holder 140, which in turn is readily accommodated by a standard liquid scintillation spectrometer because it is of the same size as a standard large vial. The bottom of the vial holder 140 is provided with a hole 142 to permit radiation from an external standard to reach the vial 141 and the sample therein. The external standard may be positioned adjacent the bottom of the vial holder 140 or within the hole 142.

Figure 6:
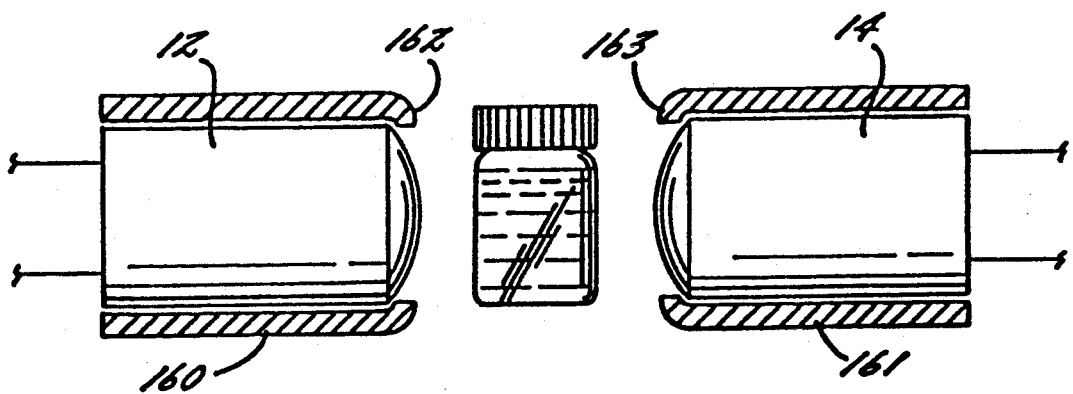
FIG. 6 is a vertical section of a sixth arrangement of the active guard shield for use with the measurement system of FIG. 1.

Another modified embodiment of the active guard shield is illustrated in FIG. 6. In this embodiment, the auxiliary scintillator is in the form of a pair of cylindrical glass sleeves 160 and 161 surrounding the photomultiplier tubes 12 and 14, respectively. The ends of the sleeves 160 and 161 adjacent the faces of the photomultiplier tubes form inwardly extending lips 162 and 63, respectively. All surfaces of the sleeves 160 and 161, except the innermost surfaces of the lips 162 and 163, are silvered so that the sleeves function as light pipes to guide light from scintillations occurring therein to the photocathodes of the respective photomultiplier tubes. This configuration of the guard shield is preferably used in combination with one or more of the configurations of FIGS. 2-5. Indeed, the configurations of FIGS. 2-5 may be used in combination with each other.

EXAMPLE

A series of comparative tests were conducted with a commercial Packard 2000 Series Liquid Scintillation Counter to compare the results obtained with (1) a plastic guard shield of pyrene and 9, 10-diphenylanthrocene (DPA) in a vinyl toluene polymer, and (2) a glass guard shield made of oxides of lithium, magnesium, silicon and cerium. In each case, a standard $^3$H sample and a standard $^{14}$C sample were measured in the Low Level Count Mode ("LLCM"), i.e., with maximum burst counting discrimination. For comparison purposes, each sample was also measured without any guard shield, in both the Low Level Count Mode and with no burst counting discrimination ("ROM out").

The pyrene-DPA-vinyl toluene guard shield was prepared by dissolving pyrene and 9,10-DPA in distilled inhibitor-free vinyl toluene monomer at concentration levels of 6 grams/liter and 0.3 grams/liter, respectively. The solution was purged of dissolved oxygen by passing nitrogen gas through the solution, and then polymerized by heating. The resulting polymer was formed into a cylindrical vial holder having a central wall for receiving a standard 7-ml. vial. The vial holder was 1.9 inches long with an outside diameter of 1.05 inches, an inside diameter of 0.7 inch, and a base thickness of 0.1 inch.

The glass guard shield was a cylindrical vial holder having the same dimensions described above, made of a lithium-magnesium-silicon-cerium glass supplied by SES Technology Consultants, Sandbank, Scotland.

The $^3$H sample was a cylindrical vial holder having the same dimensions described above, made of a lithium-magnesium-silicon-cerium glass supplied by SES Technology Consultants, Sandbank, Scotland.

The $^3$H sample was a 3.5-ml. cocktail of toluene containing 6 grams/liter PPO, 0.2 grams/liter dimethyl POPOP, and about 139,000 DMP of tritiated toluene. The $^{14}$C sample was a 3.5-ml. Cocktail of toluene containing 6 grams/liter PPO, 0.2 grams/liter POPOP, and about 63,000 DPM of carbon-14. Each sample was measured in a standard 7-ml. glass vial. The results of the tests are set forth in the following table:

| Count Mode | Vial Holder | 3H Efficiency % | | 14C Efficiency % | | Background (CPM) | | | E²/B | |
|---|---|---|---|---|---|---|---|---|---|---|
| | | 0–512 keV | .5–12.5 keV | 0–512 keV | 18–102 keV | 0–512 keV | .5–12.5 keV | 18–102 keV | 3H .5–12.5 keV | 14C 18–102 keV |
| ROH OUT | None | 54.59 | 54.36 | 95.21% | 61.71% | 27.13 | 16.84 | 5.36 | 175.5 | 710.5 |
| LLCM | None | 49.16 | 48.97 | 73.89 | 47.56 | 7.45 | 4.98 | 1.09 | 481.54 | 2075.2 |
| LLCM | Plastic | 47.35 | 47.16 | 71.46 | 44.44 | 4.27 | 2.63 | 0.82 | 845.7 | 2408.4 |
| LLCM | Plastic | 47.63 | 47.44 | 71.66 | 44.79 | 3.88 | 2.32 | 0.69 | 970.1 | 2907.5 |
| LLCM | Glass | 45.35 | 45.16 | 71.72 | 43.39 | 8.18 | 5.79 | 0.52 | 352.2 | 3620.6 |
| LLCM | Glass | 46.38 | 46.21 | 72.12 | 43.75 | 4.60 | 3.10 | 0.49 | 688.8 | 3906.3 |

The data in the above table shows that the use of the glass guard shield increased E²/B for both the carbon-14 and the tritium samples, and reduced for the carbon-14 samples E²/B was increased more by the glass guard shield than the plastic guard shield In a second series of tests, the $^3$H sample was a 3.5-ml. cocktail of benzene containing PPO and POPOP at concentration levels of 6 grams/liter and 0.4 grams/liter, respectively, and tritiated benzene of 140,000 DPM. The $^{14}$C sample was a 3.5-ml. cocktail of benzene containing PPO and POPOP at concentration levels of 6 grams/liter and 0.4 gram/liter, respectively, and carbon-14 benzene of 70,000 DPM.

The results of the tests are set forth in the following table:

| Vial Holder | 3H Eff % | 14C Eff % | Background (CPM) | | E²/B | |
|---|---|---|---|---|---|---|
| | 2–9 keV | 10–76 keV | 2–9 keV | 10–76 keV | 3H | 14C |
| Plastic | 36 | 59 | 1.48 | 0.94 | 864 | 3703 |
| Glass | 36 | 58 | 1.6 | 0.8 | 819 | 4153 |

Again the use of the glass guard shield increased E²/B for the carbon-14 sample and reduced E²/B for both the carbon 14 and the tritium samples, and for the carbon-14 sample E²B was increased more by the glass guard shield than the plastic guard shield.

As is apparent from the foregoing description, the system of this invention provides significantly improved accuracy of measurement of low level liquid scintillation by providing improved discrimination between scintillations caused by true sample radioactivity and those produced as a result of internal as well as external background activity The system is extremely simple, versatile, and convenient to use and does not require the additional expense, complexity and inconvenience of bulky external guard shielding arrangements, along with the additional detectors and anti-coincidence detection systems associated with such shields.

We claim:

1. A low-level liquid scintillation measurement system for counting sample optical events resulting from the radioactive decay of a constituent of a sample to be measured while reducing the counting of background optical events which are optical events produced by background radiation and which create electrical pulses other than pulses representing a sample optical event, said system comprising:

a plurality of detection means located adjacent the sample for detecting optical events and for converting optical events into electrical pulses, coincidence sensing means for receiving said electrical pulses from said plurality of detection means and producing a trigger pulse when said electrical pulses from said plurality of detection means coincide with each other, burst detection means for receiving said trigger pulses from said coincidence sensing means and said electrical pulses from said plurality of detection means for determining the number of electrical pulses present in a selected interval following each of said trigger pulses, evaluation means connected to the burst detection means for determining, in response to the number of pulses detected in said selected interval, the extent to which the optical event represented by the corresponding trigger pulse should be treated as a sample optical event or a background event, and an active guard shield arrangement comprising an auxiliary scintillator optically coupled to said plurality of detection means, said shield being adapted to be excited by background radiation and to effectively increase the number of electrical pulses present in said selected interval following a trigger pulse generated as a result of said coincident pulses produced due to the background radiation, so as to allow said measurement system to accurately evaluate the number of pulses detected in the selected interval and determine the extent to which a trigger pulse is to be treated as a sample optical event, said auxiliary scintillator comprising a glass including lithium, magnesium, silicon and cerium.

2. The measurement system of claim 1 wherein said auxiliary scintillator comprises oxides of lithium, magnesium, silicon and cerium 3. The measurement system of claim 1 wherein said auxiliary scintillator forms a vial holder for receiving a vial containing the sample to be measured, and said vial holder has a hole in the bottom wall thereof to allow radiation from an external standard to reach the sample.

* * * * *